US009059616B1

(12) United States Patent
Rao

(10) Patent No.: US 9,059,616 B1
(45) Date of Patent: Jun. 16, 2015

(54) INSULATION SYSTEM FOR A STATOR BAR WITH LOW PARTIAL DISCHARGE

(71) Applicant: Dantam K. Rao, Niskayuna, NY (US)

(72) Inventor: Dantam K. Rao, Niskayuna, NY (US)

( * ) Notice: Subject to any disclaimer, the term of this patent is extended or adjusted under 35 U.S.C. 154(b) by 0 days.

(21) Appl. No.: 14/464,166

(22) Filed: Aug. 20, 2014

(51) Int. Cl.
*H02K 21/00* (2006.01)
*H02K 23/26* (2006.01)
*H02K 27/02* (2006.01)
*H02K 3/40* (2006.01)
*H02K 3/30* (2006.01)

(52) U.S. Cl.
CPC ... *H02K 3/40* (2013.01); *H02K 3/30* (2013.01)

(58) Field of Classification Search
CPC .................................. H02K 3/30; H02K 3/40
USPC ........... 310/196, 201, 208; 174/127, DIG. 13; 428/201, 209, 454
See application file for complete search history.

(56) References Cited

U.S. PATENT DOCUMENTS

| 3,891,880 | A | | 6/1975 | Britsch |
| 4,207,482 | A | | 6/1980 | Neumeyer et al. |
| 4,308,476 | A | | 12/1981 | Schuler |
| 4,318,020 | A | | 3/1982 | Meyer |
| 4,338,487 | A | | 7/1982 | Matsuo |
| 4,388,546 | A | * | 6/1983 | Schwanzer .................... 310/196 |
| 4,403,163 | A | | 9/1983 | Armerding et al. |
| 4,427,740 | A | | 1/1984 | Stackhouse et al. |
| 5,067,046 | A | | 11/1991 | Elton et al. |
| 5,175,396 | A | | 12/1992 | Emery et al. |
| 5,300,844 | A | * | 4/1994 | Schuler .................... 310/215 |
| 6,043,582 | A | | 3/2000 | Markovitz et al. |
| 6,075,303 | A | * | 6/2000 | Schuler .................... 310/201 |
| 6,103,382 | A | | 8/2000 | Smith et al. |
| 6,130,496 | A | | 10/2000 | Takigawa et al. |
| 6,194,665 | B1 | * | 2/2001 | Kuribayashi et al. ..... 174/120 R |
| 6,420,812 | B1 | | 7/2002 | Emery |
| 6,498,415 | B1 | | 12/2002 | Emery |
| 6,663,816 | B2 | | 12/2003 | Younsi et al. |
| 6,677,848 | B1 | * | 1/2004 | Emery .................... 336/206 |
| 6,768,240 | B2 | | 7/2004 | Younsi et al. |
| 6,780,457 | B2 | | 8/2004 | Baumann et al. |
| 6,815,012 | B2 | | 11/2004 | Baumann et al. |
| 6,960,859 | B2 | | 11/2005 | Baumann et al. |
| 7,052,568 | B2 | | 5/2006 | Tamura et al. |
| 7,427,712 | B2 | | 9/2008 | Emery |
| 7,651,963 | B2 | * | 1/2010 | Smith et al. .................... 442/117 |

(Continued)

FOREIGN PATENT DOCUMENTS

EP 2333938 6/2011
EP 2405558 1/2012

Primary Examiner — Kevin R Kruer

(57) ABSTRACT

The invention discloses an insulation system for a stator bar in high voltage electric machines, comprising an anti-corona tape that is wound uniformly and continuously over the entire length of a bare bar. The anti-corona tape comprises a thin resistive sublayer engaged to a thick insulative sublayer. The insulative sublayer provides resistance against high voltage. The resistive sublayer protects the insulation against partial discharges. These partial discharges can occur in voids, such as delamination voids, transposition crossover gaps, strand corners, slot voids, overlap voids etc. The resistive sublayer also increases the thermal conductivity hence reduces the operating temperature. Such insulation using a single-tape approach can replace several layers used in prior-art, viz., an internal corona protection layer, an external corona protection layer, a stress-grading layer and mica layers. This single-tape approach also simplifies the process of manufacturing the stator bar and reduces its cost.

6 Claims, 9 Drawing Sheets

(56) References Cited

U.S. PATENT DOCUMENTS

| | | |
|---|---|---|
| 7,705,243 B2 | 4/2010 | Emery et al. |
| 7,742,676 B2 | 6/2010 | Tilliette et al. |
| 7,804,218 B2 | 9/2010 | Higashimura et al. |
| 7,893,357 B2 | 2/2011 | Williams et al. |
| 7,893,358 B2 * | 2/2011 | Baumann .................. 174/120 R |
| 8,044,550 B2 | 10/2011 | Baumann |
| 8,313,832 B2 * | 11/2012 | Smith et al. .................. 428/324 |
| 2005/0274540 A1 * | 12/2005 | Smith et al. .................. 174/209 |
| 2006/0234576 A1 * | 10/2006 | Smith et al. .................. 442/110 |
| 2006/0258791 A1 * | 11/2006 | Okamoto et al. ............. 524/449 |
| 2007/0114052 A1 * | 5/2007 | Emery ............................ 174/36 |
| 2008/0050580 A1 * | 2/2008 | Stevens et al. ................ 428/327 |
| 2008/0106157 A1 | 5/2008 | Higashimura et al. |
| 2011/0062816 A1 * | 3/2011 | Emery .......................... 310/196 |
| 2012/0001514 A1 | 1/2012 | Baumann et al. |
| 2012/0161570 A1 | 6/2012 | Schutten et al. |
| 2013/0193796 A1 | 8/2013 | Emery |
| 2014/0246929 A1 * | 9/2014 | Francese et al. ................ 310/52 |

\* cited by examiner

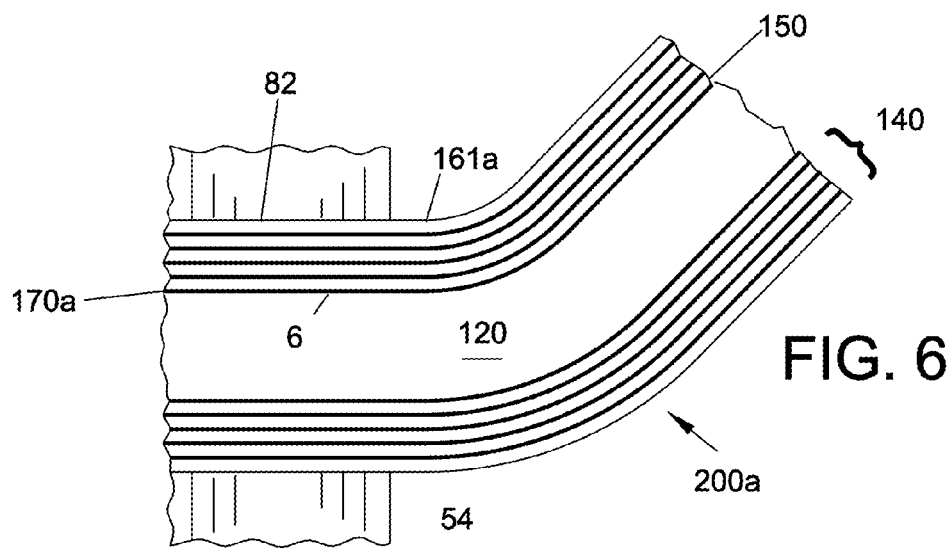
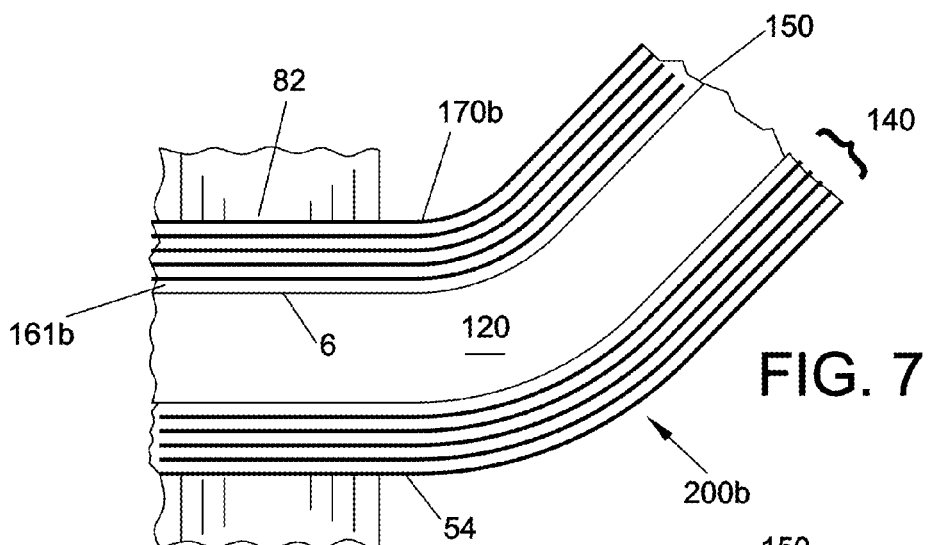
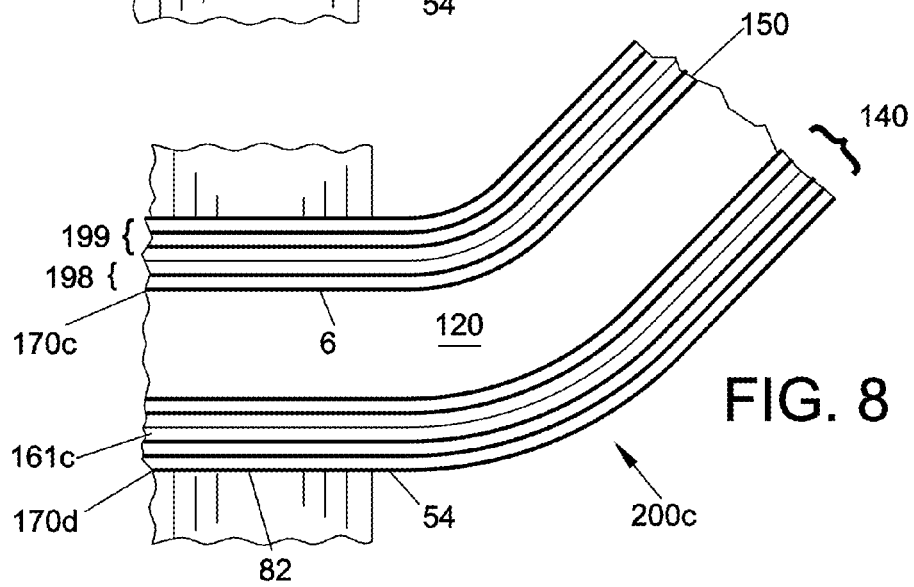

delamination voids in groundwall insulation

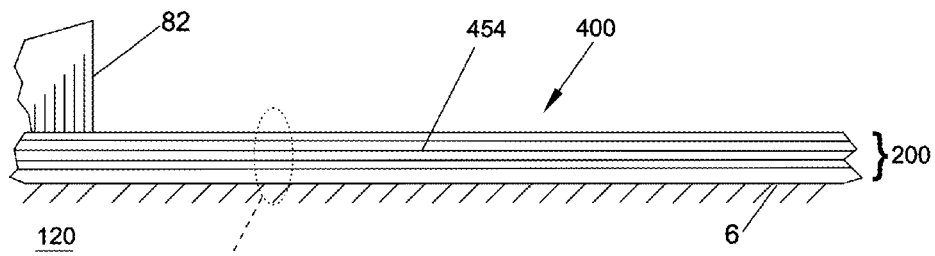
FIG. 17
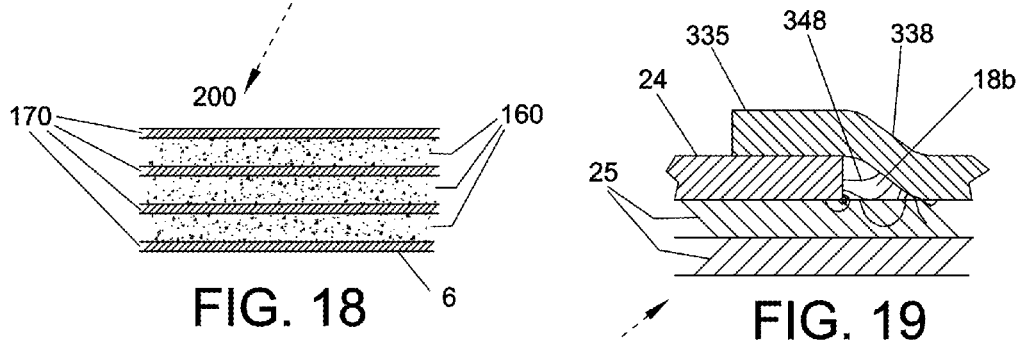
FIG. 18
FIG. 19
prior art
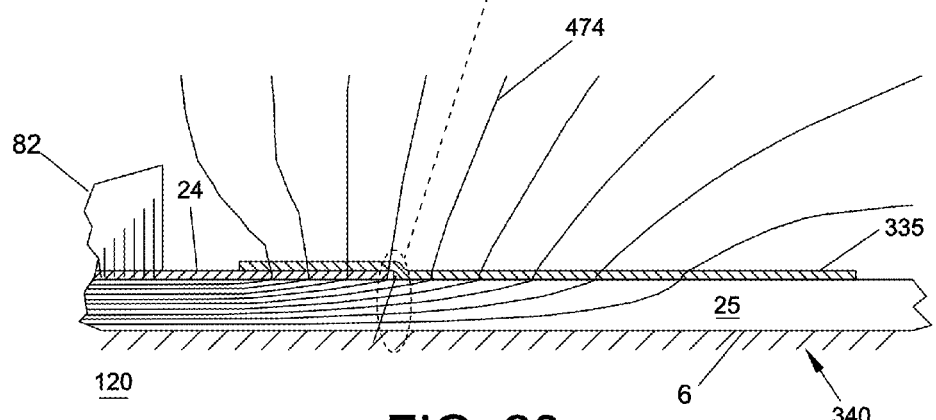
FIG. 20
prior art

INSULATION SYSTEM FOR A STATOR BAR WITH LOW PARTIAL DISCHARGE

BACKGROUND

The present disclosure relates generally to a stator bar in a high voltage electric machine, particularly to the insulation system therein.

FIG. 1 shows cross-section of a stator bar 10 in a high voltage electric machine. It comprises a bare bar 120 and a prior-art insulation system 20 over its periphery 6. The bare bar 120 is made of two or more columns of transposed conductive strands 122, with empty spaces filled with fillers to form a rectangular section having four rounded corners. As shown in FIG. 2 and FIG. 5, the bare bar has a central straight part 123 that sits inside a slot of iron lamination core 82 and two bent-arms 6a, 6b that protrude out of the slot. All insulation systems follow this profile of the bare bar 120.

This insulation system 20 provides insulation against high voltage and simultaneously reduces partial discharges in some, but not all, air voids. Partial discharges (aka corona or void discharge) are caused by electric fields (aka electric stress) that are beyond the dielectric strength of air, so cause ionization currents, which literally burn the insulation locally and degrade its life. The prior-art of insulating a bare bar is well known, as taught for example in U.S. Pat. No. 6,420,812 or EP2333938. A representative prior-art insulation system 20 comprises four layers: (1) Internal Corona Protection (ICP) layer 22 over the periphery 6 of the bare bar 120. (2) Multiple mica layers 28 constituting a groundwall insulation 25, laid over 22. (3) External Corona Protection (ECP) layer 24, laid over 28 and engaging the iron laminations 82, with its edge 16 extending few inches out of the core (4) a Stress Grading Layer (SGL) 26 that overlaps the edge 16 of the ECP layer.

Thus, the prior-art approach is to use four layers, each made of resistive or insulative tapes with thickness ranging 0.003 to 0.015 inch, but with characteristics tailored to control discharges in specific void locations. For example, ICP layer 22 combats corona in the strand voids (crevices where two strand corners meet), transposition voids 13 (crossover areas at the top and bottom sides) and voids in the fillers. The ECP layer 24 combats corona in slot voids 14 (caused by irregular edges of iron laminations 82). The SGL layer 26 combats surface discharges from the edge 16 of the ECP layer.

At present, prior-art has no mechanism to combat the delamination voids 18 in a finished groundwall insulation 25. Such voids can occur when the mica layers 28 delaminate during operation. Further, the resistivity of the SGL layer 26 can increase 1000% during curing; it can change substantially with the field. A mismatch between ECP and SGL caused by such wide variation in resistance often results in a visible discoloration around the overlapping edge 16, a defect known as "white band" in the trade. A white band is difficult to repair and can lead to significant downtime.

Obviously, the prior-art insulation system 20 with multiple layers 22, 24, 26, 28, each tailored for specific purpose, is labor intensive, expensive and prone to defects during fabrication and operation. Its fabrication requires highly skilled labor with considerable attention to details. This necessity for tight quality control greatly increases the cost. An object of the present disclosure is therefore to provide a single layer that provides insulation against high voltages and protects itself against partial discharges in wide range of voids.

FIG. 3 shows various methods used in the prior-art (e.g., U.S. Pat. No. 6,130,496) to wind such tapes. They are known as butt-lapped, brick-lapped and half-lapped methods of winding. In the butt-lapped method 32 (aka edge-lapped), in a single row, successive tapes 42, 44 are wound side by side without gaps; a tape in the next layer (or row) piles on top of that in the previous layer, with no overlap. In the brick-lapped method 34, a row-layer comprises tapes wound side by side as in butt lap; but in the next row-layer, the tape 46 overlaps the tape 47 in previous row-layer by half-width, as in a brick-lay fashion. In the half-lapped method 36, one wraps a top tape 48 over a previous tape 49 such that an edge of the top tape 48 lies in the middle of the previous tape 49. This method results in a layer that is at least two thicknesses of the tape. Of course, a person skilled in the art could utilize various combinations of butt-lap, brick-lap and half-lap methods to achieve desired voltage resistance and flexural strength.

SUMMARY OF THE INVENTION

The invention discloses an insulation system over the bare bar, comprising multiple layers of an anti-corona tape wound tightly, continuously and uniformly over the periphery of the entire bare bar, including straight-part and bent end-arm parts. Solidification processes such as VPI, press cure etc. as well known in the art are used after winding to form the final solid insulation. Either resin rich or thin bond line systems can be used for solidification. This insulation system can be formed in several embodiments.

In a first embodiment, the insulation system is formed by winding multiple layers of the anti-corona tape over the entire periphery and entire length of the bare bar. The anti-corona tape consists of an insulative sublayer engaged to a resistive sublayer. When winding of the first layer, the tape is laid with its resistive sublayer in contact with the periphery of the bare bar. The winding is preferably carried out using half-lapped method, even though the butt-lap method or brick-lap method can be used. The winding is continued until it reaches the slot. This first embodiment results in an insulative sublayer in contact with the irregular edges of the laminations.

In a second embodiment, the insulation system is formed by winding multiple layers of the anti-corona tape tightly, continuously and uniformly over the entire periphery and entire length of the bare bar. The anti-corona tape consists of an insulative sublayer engaged to a resistive sublayer. When winding of the first layer, the tape is laid with its insulative sublayer in contact with the periphery of the bare bar. The winding is preferably carried out using half-lapped method, even though butt-lap or brick-lap method can also be used. The winding is continued until it reaches the slot. This second embodiment results in a resistive sublayer in contact with the irregular edges of the laminations.

In a third embodiment, the insulation system is formed by winding multiple layers of the anti-corona tape tightly, continuously and uniformly over the entire periphery and entire length of the bare bar. The anti-corona tape consists of an insulative sublayer engaging a resistive sublayer. But the winding is broken into two parts. The first part is wound with a resistive sublayer contacting the periphery of the bare bar. After few layers are wound this fashion, it will have an insulative sublayer at its periphery. The second part is wound over the first part, with an insulative sublayer in contact with this insulative sublayer at the periphery of the first part. The winding is preferably carried out using half-lapped method, butt-lap method or brick-lap method. This third embodiment results in a resistive sublayer in contact with both the periphery of the bare bar and with the irregular edges of laminations.

A first embodiment of the anti-corona tape comprises a relatively thick electrically insulative sublayer engaged to a relatively thin electrically resistive sublayer. A second embodiment of the anti-corona tape comprises a relatively thick electrically insulative sublayer sandwiched between two relatively thin electrically resistive sublayers.

The insulative sublayer is preferably a mica tape. Alternately, it is made of a highly insulative substance in a suitable resin and solvents spread over a carrier as well known in the art. The substance may be mica, PET, PE, XLPE, silicon tape etc, with the desired insulation and corona resistance. Any openings in a carrier mesh may optionally be filled with insulative, resistive, or thermally conductive materials to enhance a specific characteristic.

The resistive sublayer is substantially thinner than the insulative sublayer. It can be a coating engaged to one surface of the insulative sublayer, a pattern imprint or a thin foil. Throttle pattern-metallization, conductive ink printing, conductive adhesive stamping or foil bonding can be used to enhance the resistance of the resistive sublayer. A throttle pattern metallization uses a pattern of areas of low resistance in series with patterns of areas of high resistance. The width of the resistive sublayer could equal or smaller than that of the insulative sublayer.

The disclosed insulation system reduces partial discharges at almost all areas within the insulation. Such insulation system will simplify the manufacturing process as it avoids the need to wind four different types of insulation tapes as used in the prior-art. This can reduce the cost of stator bar and extend its life. Its higher thermal conductivity also reduces the operating temperature. Its conductive sublayers can ease thermal stresses caused by different thermal expansion coefficients.

BRIEF DESCRIPTION OF THE DRAWINGS

FIG. 6 shows a first embodiment of the disclosed insulation system made by winding an anti-corona tape comprising an insulative sublayer engaging a resistive sublayer, with a resistive sublayer engaging the periphery of the bare bar.

FIG. 7 shows a second embodiment of the disclosed insulation system, made by winding an anti-corona tape comprising an insulative sublayer engaging a resistive sublayer, with an insulative sublayer engaging the periphery of the bare bar.

FIG. 8 shows a third embodiment of the disclosed insulation system. In this embodiment, one resistive sublayer engages the periphery of the bare bar while another resistive sublayer engages the laminations.

FIG. 17 shows the disclosed insulation system over an end-arm of the bare bar. It highlights that using the disclosed insulation system results in uniformly distributed equipotential lines. This indicates that it results in little or no electric stress concentration.

FIG. 18 details few layers in the end-arm shown in FIG. 17. Each layer is made of anti-corona tape comprising an insulative sublayer and a resistive sublayer and does not contain electrical discontinuities.

FIG. 19 details a prior-art insulation system around an area where a stress-grading layer overlaps the external corona protection layer. It shows a ring-shaped void around the overlapped zone. Partial discharge in such void can produce a white-band damage.

FIG. 20 shows a prior-art insulation system over an end-arm. This uses a stress-grading layer overlapping an external corona protection layer. It shows that such ECP/SGL. arrangement can result in non-uniformly distributed equipotential lines. This indicates nonuniform surface stress in the overlapped area.

DETAILED DESCRIPTION OF THE INVENTION

Figure 1:
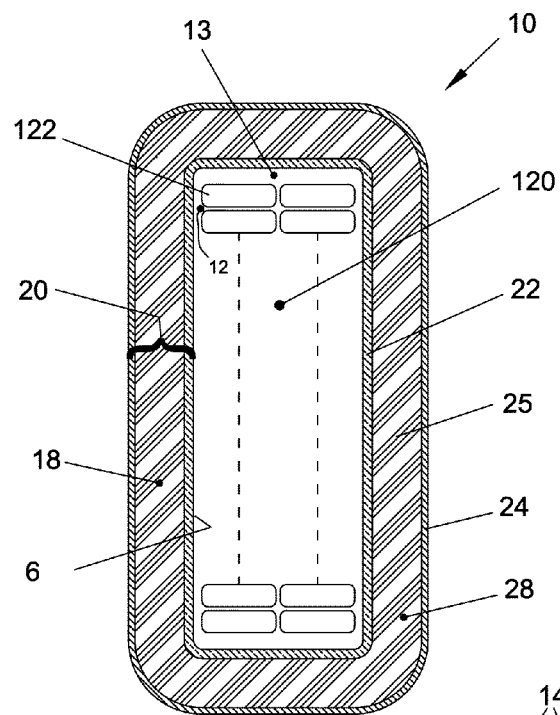
FIG. 1 shows cross section of an insulation system used in the prior-art over a bare bar in a high voltage electric machine; it details four types of insulation layers used to protect against void discharges.
Figure 2:
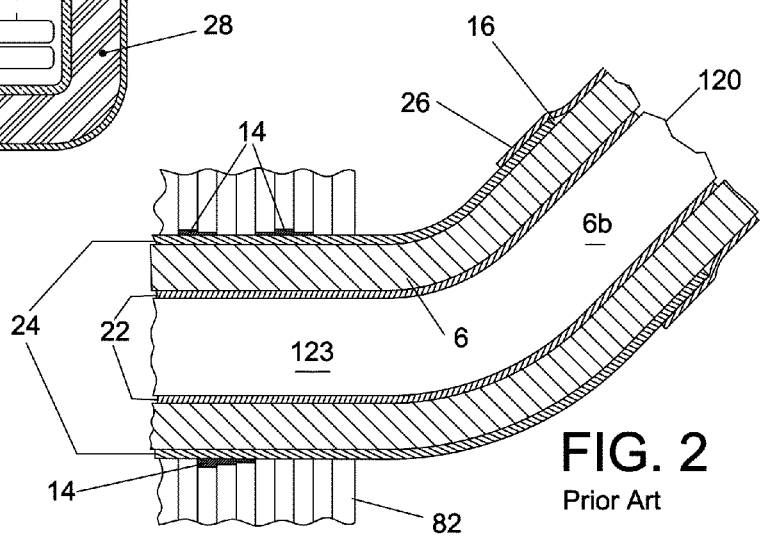
FIG. 2 shows straight and bent parts of a prior-art insulation system; it highlights a stress-grading layer overlapping an external corona protection layer.
Figure 3:
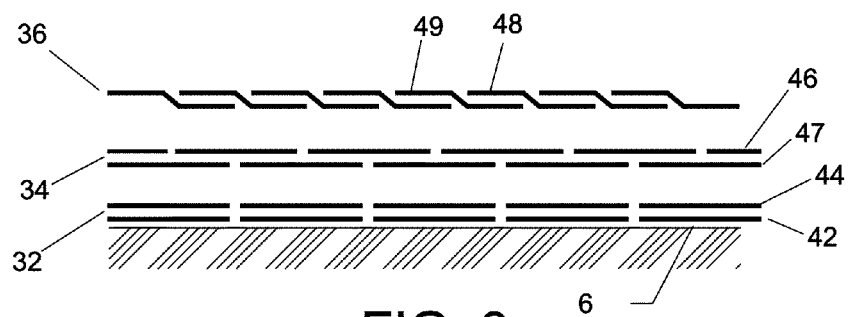
FIG. 3 shows various methods of winding an insulation tape over bare bar; they include butt-lap, brick-lap and half-lap methods.
Figure 4:
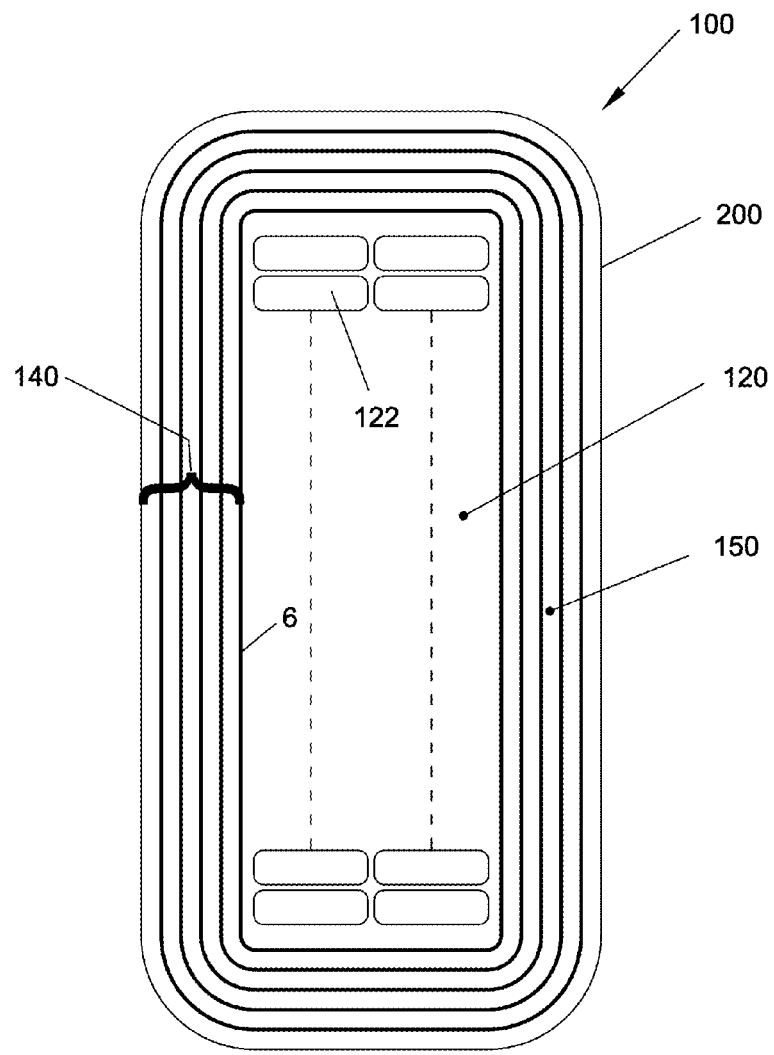
FIG. 4 shows cross-section of the disclosed insulation system, comprising multiple layers of an anti-corona tape wound over the bare bar.
Figure 9:
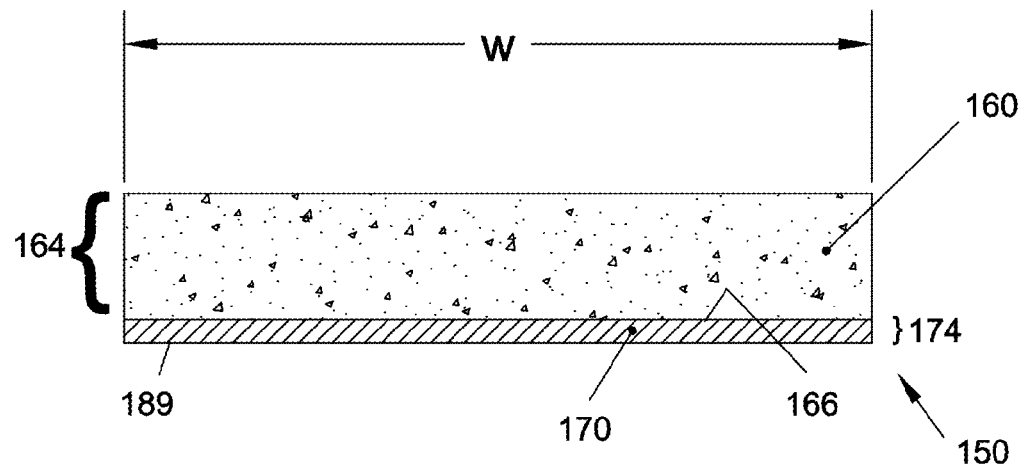
FIG. 9 shows the cross-section of a preferred embodiment of the anti-corona tape. This embodiment comprises an insulative sublayer engaging a resistive sublayer.
Figure 10:
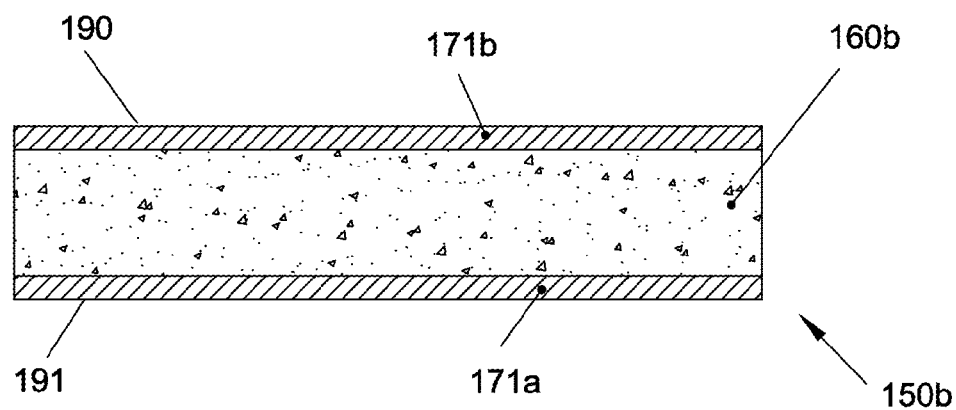
FIG. 10 shows the cross-section of another embodiment of the anti-corona tape. This embodiment comprises an insulative sublayer sandwiched between two resistive sublayers.

FIG. 4 shows the disclosed insulation system 200 in a cross-section of a stator bar 100, applied over the periphery of the bare bar 120. It is made by winding multiple layers 140 of an anti-corona tape 150 tightly, continuously and uniformly over the entire bare bar 120. The anti-corona tape 150 comprises a first insulative sublayer 160 engaged to a second resistive sublayer 170 as shown in FIG. 9. Alternatively the anti-corona tape 150b comprises a first insulative sublayer 160b sandwiched between two second resistive sublayers 171a, 171b as shown in FIG. 10. Even though this figure shows only five layers in 140, it can comprise arbitrary number of layers.

Figure 5:
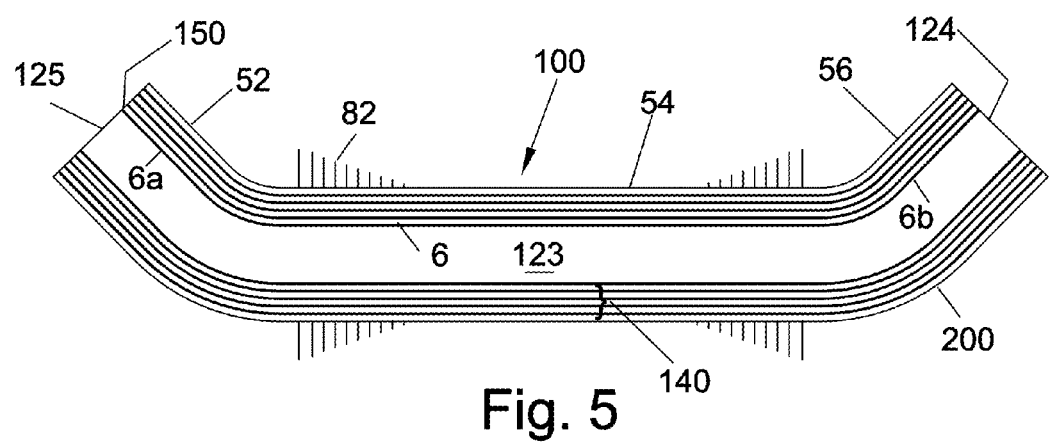
FIG. 5 shows longitudinal section of the disclosed insulation system over entire length of the bare bar, including the straight and bent portions.

FIG. 5 shows the disclosed insulation system 200 in a longitudinal section of the stator bar 100. It illustrates the method of forming the insulation system 200 using the anti-corona tape 150. A pre-tensioned anti-corona tape 150 is attached to the bare bar 120 at a first edge 125. It is wound continuously in half-lapped manner over the first bent-arm 6a, the straight part 123 and the second bent-arm 6b to reach the second edge 124 of the bare bar (wherein 52, 54, and 56 refer to the tape applied to 6a, 123, and 6b, respectively). The tape is then wound from the second edge 124 back to the first edge 125 to form the second layer. Multiple layers 140 are wound in this fashion continuously until one achieves a desired thickness of insulation. One preferably uses automated tape winding machines in winding the multiple layers as well known in the art. Optionally one uses partially evacuated clean anti-static room for winding to prevent defects caused by dust particles.

The multiple layers preferably use the known art of half-lapped manner of winding. Alternatively, the brick-lapped, butt-lapped methods or combination thereof can be used. In conventional brick-lap or butt-lap methods, normally there is no gap between the edges of successive tapes in a row. In such winding, the resistive sublayers may form a continuous conductive surface. Such surface can greatly increase eddy loss. Optionally one can introduce a small gap between successive tapes in a row layer to break the eddy paths. Such eddy-breaking gap thickness may range 0.25 to 1 mm. Optionally one can ground all resistive sublayers so they are at the same potential as the laminations. One can use known post-taping steps such as VPI curing, press-curing etc. to solidify the insulation.

FIGS. 6-8 show three embodiments 200a, 200b and 200c of the insulation system 200, detailing around bent area of the stator bar within iron laminations 82. In these figures, bold lines 170a, 170b, pictorially represents a resistive sublayer 170 in an anti-corona tape 150. FIG. 6 shows a first embodiment 200a wherein a resistive sublayer 170a of the innermost layer of the embodiment 200a engages the periphery 6 of the bare bar 120. In this embodiment, an insulative sublayer 161a of the outermost layer engages the irregular edges of iron laminations 82. FIG. 7 shows a second embodiment 200b wherein an insulative sublayer 161b of the innermost layer engages the periphery 6 of the bare bar 120. As a result, in this embodiment 200b a resistive sublayer (170b,170d) of the outermost layer engages the iron laminations 82. FIG. 8 shows a third embodiment 200c where in the insulation system comprises two parts of multiple layers. In both parts, multiple layers comprise the anti-corona tape. In the first part 198, a resistive sublayer of innermost layer engages periphery 6 of the bare bar 120. The second part 199 is wound over the first part wherein an insulative sublayer 161c of its innermost layer engages the periphery of the first part. As a result, in this embodiment, the resistive sublayers are in contact with both periphery 6 of the bare bar 120 as well as the irregular edges of the laminations 82. This embodiment 200c obviously has two insulative sublayers contacting each other in the middle of the insulation system. Its advantage is that it lays the resistive sublayers closest to voids in the bare bar and the iron laminations.

FIG. 9 shows cross-section of a first embodiment 150 of the anti-corona tape. This tape insulates against high voltage and protects the insulation system 200 against discharges in voids anywhere. It comprises a first insulative sublayer 160 engaged to a second resistive sublayer 170 at the interface 166. One uses known manufacturing steps that ensure that both sublayers are free of voids. The insulative sublayer 160 insulates against high voltage. The resistive sublayer 170 on the other hand protects against void discharges using following operating mechanism. If there are ten resistive sublayers, the potential gradient between successive sublayers is one-tenth of the main voltage. The air voids in any resin between successive layers are thus subjected to substantially smaller fraction of the rated voltage. This greatly reduces the void discharges. Note that such air voids are surrounded by resistive sublayers. The resistance across these layers is lower than that across air void gaps. This lower resistance shunts the current away from air voids. This further reduces concentration of electric stress in the air void, thereby avoiding void discharge. However, self-fields (caused by currents in the bare bar) or slot leakage fields (caused by currents flowing in the rotor coils) impinging the resistive sublayers can induce large eddy currents in them. The thickness and resistivity of the sublayers 170 are adjusted to lower the eddy losses in these sublayers.

Figure 11:
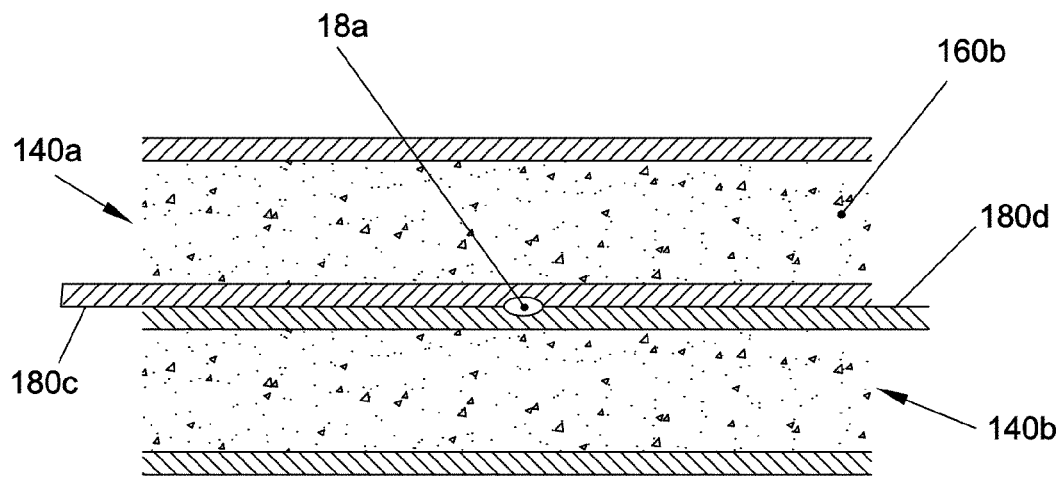
FIG. 11 shows air void trapped between two successive layers of embodiment shown in FIG. 10. Such void with conductive boundaries kills discharges within the void.

FIG. 10 shows an alternative embodiment 150b of the anti-corona tape, comprising a first insulative sublayer 160b sandwiched between two resistive sublayers 171a, 171b. In this embodiment, both exposed faces 190, 191 are electrically resistive. In an insulation system 200 that uses this embodiment 150b, the air voids can be trapped between two successive resistive sublayers. For example, FIG. 11 shows two successive layers 140a, 140b in such insulation system. Here a resistive sublayer 180c of layer 140a engages with a resistive sublayer 180d of neighboring layer 140b. Air voids such as 18a can get trapped between such resistive sublayers 180c, 180d. Then the bounding surfaces of the air voids are at the same potential. Such equi-potential boundary prevents charged ions to jump from one portion of bounded surface to another across the air void. Thus, a conductive boundary of an air void will greatly reduce void discharges.

The anti-corona tape 150 thus has a first face that is insulative and an opposite second face 189 that is conductive. Optionally, one can seal the conductive face with a thin adhesive sublayer or partially cured resin sublayer. The insulative sublayer 160 is significantly thinner than the groundwall insulation 25. In turn, the resistive sublayer 170 is far thinner than the insulative sublayer 160. Total thickness of the anti-corona tape 150 can range 0.25 to 0.5 mm (0.010 to 0.020"). The width w of the anti-corona tape ranges 25 to 50 mm (1 to 2 inches). It can be formed using different combinations of the insulative sublayer and resistive sublayer embodiments as discussed below.

The first sublayer 160 is made of a highly insulative and corona resistive material. Its thickness 164 is smaller than the corner radius of a strand 122; it can range 0.2 to 0.50 mm (0.008 to 0.020"). Its dielectric constant can range 2 to 6. It has high dielectric strength, high corona resistance and high resistivity above $10^{12}$ Ωm. A preferable insulative sublayer 160 is a conventional mica tape and as is known in the art, several options exist for the mica tape. Alternatively, commercial insulative films such as polyester, Nomex, Kapton, PE, XLPE, silicone etc. can also be used for the sublayer 160 if they meet the corona resistance and dielectric strength requirements.

The second sublayer 170 prevents void discharges in the insulation system 200 as described above. Its thickness 174 is preferably less than 0.025 mm (0.001"). This small thickness allows more space for insulation. It also ensures that the resistive sublayer does not affect the mechanical strength of the insulation system. Its width is preferably same as that of the first sublayer. Optionally it can be narrower than the insulative sublayer, which can reduce eddy loss. Preferably, it is implemented as a resistive coating over one face of the insulative sublayer 160. Such coating is integral and inseparable from the insulative sublayer 160.

The resistance of the second sublayer 170 has to be such value that it reduces void discharge, reduces eddy loss and prevents shorting of laminations. If it is as high as an insulator, it will kill eddy loss, but will not prevent void discharges. If it is as low as a metallic conductor is, it will kill void discharges, but it will suffer from huge eddy loss. When the bare bar 120 carries the rated current, its ohmic resistance produces a certain loss called copper loss $P_{cu}$. When the bare bar is protected by the insulation system 200, the resistive sublayers generate additional eddy loss $P_e$. This loss $P_e$ is sum of eddy loss due to the self-fields and slot leakage fields. Extensive computer simulations has established that a resistive sublayer 170 with resistance in the range of 200 to 1000 ohm/sq yields eddy losses that are at least four orders of magnitude lower than the copper losses and yet reduce void discharges. For example, a semiconductive coating with part number 9921 from Glyptal Inc, MA or 1181 from 3A Associates, India can meet such requirements on resistance and thickness.

One preferable embodiment of the anti-corona tape 150 employs a well-known process of vacuum metallization to deposit a second sublayer 170 over the insulative sublayer 160. In prior-art metallization technique (also called physical vapor deposition), a metal such as aluminum is heated in high vacuum until it starts to evaporate. The metal molecules are transported and condensed over the entire face of the insulative sublayer 160. But such prior-art metallization can produce a resistive sublayer with at most 10 ohm/sq resistance. This is an order of magnitude below the preferred range of 200-1000 ohm/sq, so will result in unacceptably high eddy losses. So, one needs to improve the traditional metallization technique to form the resistive sublayer.

Figure 12:
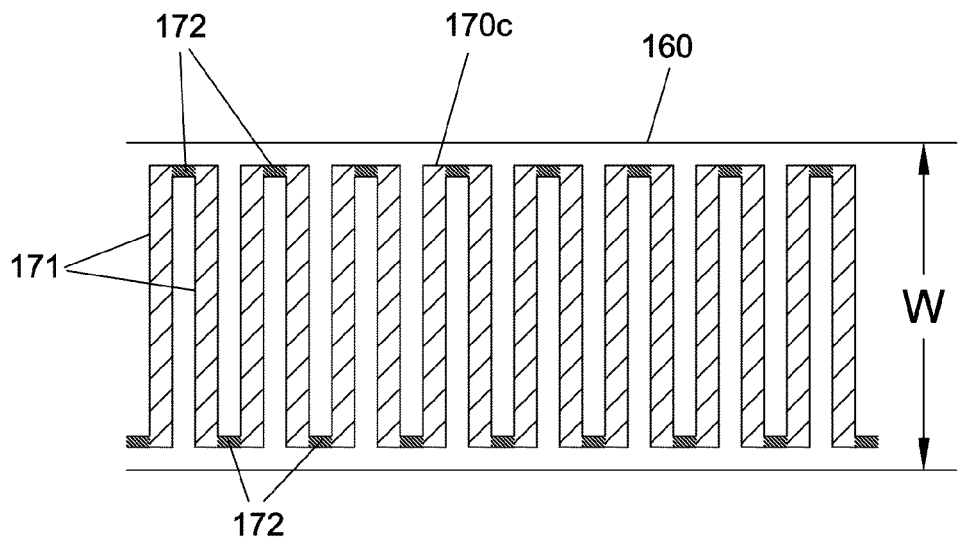
FIG. 12 shows a throttling metallization pattern comprising areas of high resistance in series with areas of low resistance.

A preferred method to increase the resistance of a metallized layer is called throttling-pattern herein. This throttling pattern comprises several higher resistance areas in series with low resistance areas, with the high-resistance areas throttling the eddy currents. FIG. 12 shows an example throttling-pattern 170c. This throttling pattern 170c comprises one set of conductive areas 171 parallel to the width of the tape. These are long and wide and offer less resistance. They are interconnected by another set of areas 172, which are laid along the length of the tape. These are shorter and narrower than 171, so their higher resistance chokes eddy currents. Several such high resistance areas 172 are in series with the low resistance areas 171, so the total resistance of the pattern is very high. Thus, one sizes the high resistance areas 172 to throttle eddy currents as much as possible. To make a throttling pattern of metallization, one prints a release material on a face of the insulative sublayer 160 where conductive metal has to be removed. The insulative sublayer 160 is then metallized as in prior-art. One then passes the sublayer through a liquid bath that reacts with the release material to dissolve it off, leaving the throttling pattern 170c. Although FIG. 12 shows one example throttling-pattern, a person skilled in the art can conceive other patterns that increase the resistance in a similar fashion without altering the scope of the invention.

Alternative is a conductive ink pattern imprinted over one face of the insulative sublayer. Conductive ink contains silver or carbon particulates in a curable matrix. Carbon based ink part number 7082 by Dupont for example has sheet resistivity of 400 ohm/sq. They can be screen printed on an insulative sublayer. They offer a best combination of acceptable resistance at low price. Ink-printed does not dig deep into the insulative sublayer, so has the advantage of not increasing thickness of the anti-corona tape.

In the disclosed insulation system, voids can only occur in the interface between successive layers of the insulation system. Voids can mostly occur within the resin bonding the anti-corona layers. A fraction of the void's boundary will be close to or contacting the second sublayer, so will be conductive while the remainder will be insulative. (This contrasts the prior-art where all of void boundary is completely insulative). Since the conductive portion is at same potential with zero electric field, so it discourages sharp electric gradients, so greatly reduces potential for void discharges.

Finite element analysis was conducted to investigate if the disclosed insulation system 200 can offer better protection against the void discharges than a prior-art insulation system 20. The model used a 100×25 mm bare bar 120 rated at 10.6 kV. It simulated both the disclosed insulation system 200 and the prior-art insulation system 20 both being 3.81 mm thick. So both produce identical average stress of $E_{av}$=2.78 kV/mm (70 V/mil). But the insulation contains electrical hot spots such as corners, voids etc. where the peak electrical stress $E_{pk}$ will be significantly higher than this average stress $E_{av}$. For example, the peak electric stress at corners of a bare bar can be as high as $E_{pk}$=5.3 kV/mm (135 V/mil) per U.S. Pat. No. 5,973,269. Because voids attract electric stress, peak electric stress in a void can be substantially higher than this. To investigate such peak electric stresses, a ellipsoidal void that is 0.1 mm thick is introduced along the mid-axis of both insulation systems 200, 20, and the corner of the bare bar is set to 2 mm.

Breakdown strength of air is generally quoted as 3 kV/mm (75 V/mil). But for air in a trapped void, the breakdown strength increases with pressure and temperature. In hydrogen generators that operate at high gas pressure, the breakdown strength of trapped air increases to $E_{max}$=9 kV/mm (225 V/mil) per G. C. Stone, Electrical Insulation in Rotating Machines, IEEE Press, 2004, p. 21. For long time reliability, the peak electrical stress $E_{pk}$ in an air void should be below this $E_{max}$.

Figure 14:
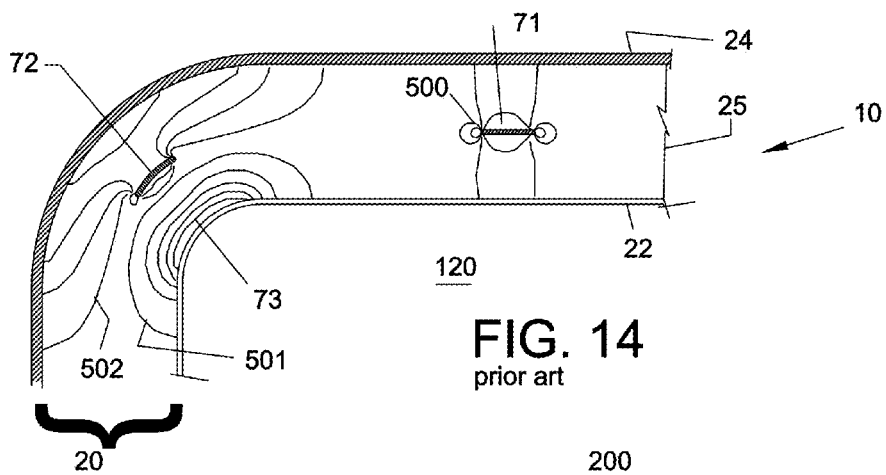
FIG. 14 shows same prior-art insulation over a bare bar. It highlights concentration of electric fields around the voids and corners.
Figure 15:
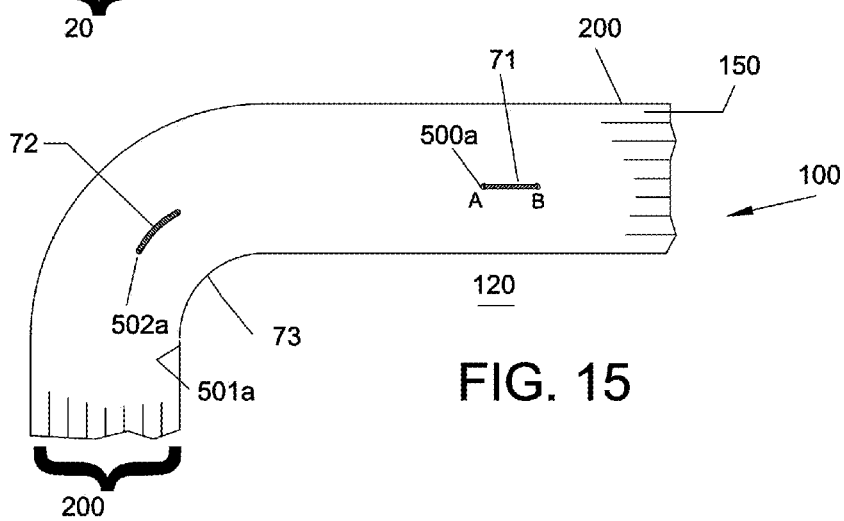
FIG. 15 shows the upper left corner of the disclosed insulation system over the same bare bar shown in FIG. 14. It highlights that this insulation system results in uniform electric field around voids. This indicates that the disclosed insulation system reduces concentration of electric stress around the voids and corners.

The FEM software solves for the electric field E in the Maxwell-derived equation $\nabla \cdot (\sigma E + j\omega \in \nabla V) = 0$. Here V=voltage distribution, $E = -\nabla V$=electric stress or electric field distribution, $\omega = 2\pi f$=circular frequency, f=cyclic frequency, $\sigma$=conductivity, $\in = k\in_o$=permittivity, $\in_o$=permittivity of free space and k=dielectric constant. FIG. 14-15 present key results of this simulation.

Figure 13:
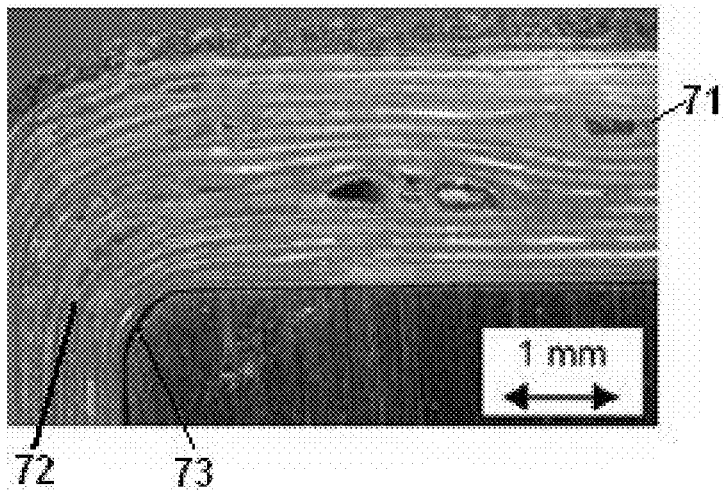
FIG. 13 shows the upper left corner of a prior-art insulation system over a bare bar. It highlights multiple layers it uses and voids formed within the groundwall insulation.

FIG. 13 shows upper left corner of a stator bar 10 that uses a prior-art insulation system 20 comprising ICP layer 22, groundwall insulation 25 and ECP layer 24. It shows typical delamination voids 71, 72 that can occur in the groundwall insulation 25. FIG. 14 shows the electric fields that result around these voids 71, 72 and corner 73. It shows that electric field lines 500, 502, and 501 that concentrate around the air voids 71, 72 and corner 73 respectively. In contrast, FIG. 15 shows the stator bar 100 that contains same air voids, but uses the disclosed insulation system 200 to reduce concentration of electric stress. The anti-corona tapes 150 are shown only near the boundaries herein for clarity. This shows the electric field lines 500a, 502a, 501a around the air voids 71, 72 and corner 73 in the disclosed insulation system 200. It clearly shows that the disclosed insulation system 200 smoothes electric fields greatly. These two figures qualitatively confirm that the disclosed insulation system 200 greatly reduces void discharges.

Figure 16:
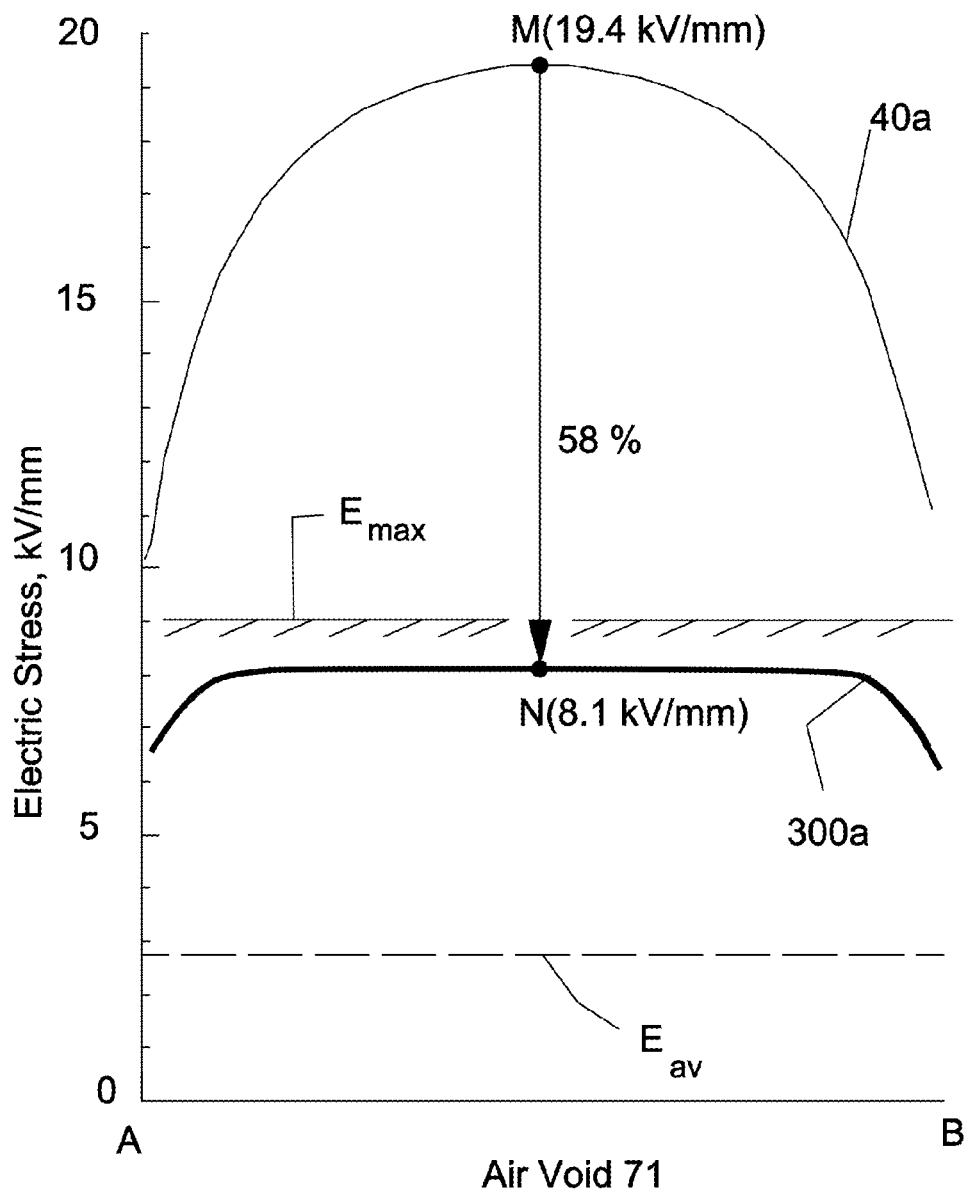
FIG. 16 plots variation of electric stress in an elliptical void along its longitudinal axis. It shows the reduction in stress that can be achieved by the disclosed insulation system over prior-art insulation system.

FIG. 16 shows assesses the quantitative reduction in electric stress offered by the insulation system 200 over the prior-art insulation system 20. It plots the electric stress in the air void 71 along its longitudinal axis. Its y-axis shows the electric stress while the x-axis shows distance from the end A to the end B of the void along its mid-axis. The curve 40a for prior-art insulation 20 shows that the stress starts to rise from the end A, peaking to M=19.4 kV/mm at the center of the void, and then falls down at the end B. This peak stress is nearly double the allowable peak stress of 9 kV/mm. So air in the void in the prior-art insulation system 20 can break down, causing void discharges. In contrast, curve 300a for the disclosed insulation system 200 show it reduces the peak stress at the middle of the void to N=8.1 kV/mm. Thus, the disclosed insulation system 200 reduces the peak stress by 58% from that of prior-art. This is also below the allowable peak electric stress of 9 kV/mm. So the disclosed insulation system greatly reduces void discharges.

FIGS. 17 and 18 show the disclosed insulation system 200 over bare bar 120 in an end-arm 400 that protrude from the iron laminations 82. Only the outline of 200 is shown and the anti-corona layers are not shown in FIG. 18 for clarity. Instead, FIG. 18 shows three layers of this insulation system 200, comprising insulative sublayers 160 and resistive sublayers 170, with a resistive sublayer engaging the periphery 6 of the bare bar 120. FIG. 17 also shows equipotential lines 454 through this insulation system 200. These equipotential lines 454 are seen to be distributed uniformly throughout the insulation system 200. Such uniform distribution indicates that there is no stress concentration inside the insulation system 200.

In contrast, FIGS. 20 and 19 show a prior-art insulation system 20 that uses ECP layer 24 overlapped by SGL 335 in the end-arm 340. FIG. 20 shows that the equipotential lines 474 flare out into air. But they are spaced equally. This indicates that SGL does avoid stress concentration (by distributing the surface stress equally over the entire end arm). But FIG. 19 detailing the overlapped region, shows around the bend 338 in SGL an annular overlap void 18b can be formed. Air trapped in such overlap void 18b attracts electric stress 348 as shown. Such concentration of electric stress can cause visible discoloration called white band damage. In contrast, the disclosed insulation system 200 does not have any overlapped regions, so does not create any such air voids, and thereby avoids white band damage.

Figure 21:
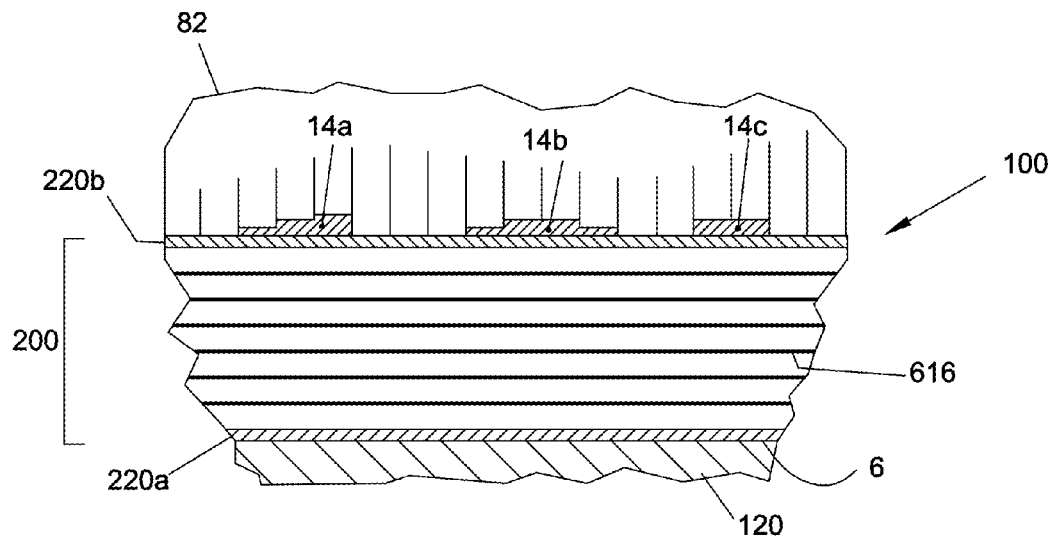
FIG. 21 presents the disclosed insulation system around the irregular edges of the laminations. It indicates that the disclosed insulation system results in uniformly distributed equipotential lines within the slot voids, viz., zero stress concentration in the slot voids.

FIG. 21 shows the disclosed insulation system 200 in a partial longitudinal section of the stator bar 100 that is positioned inside the iron laminations 82 whose irregular edges form slot voids 14a, 14b, 14c. The disclosed insulation system 200 uses first embodiment 200a that has an innermost resistive sublayer 220a contacting the bare bar 120 and an outermost insulative sublayer 220b contacting the iron laminations 82. For clarity, other inner layers of the anti-corona tape 150 are not shown. This figure shows potential lines 616 to be equi-spaced uniformly within the insulation system. This is caused by the equi-spacing of resistive sublayers inside the insulation system 200. This results in electric stress that is uniform throughout the insulation. Thus, the insulation system 200 reduces stress concentration in the slot voids 14a, 14b and 14c.

Figure 22:
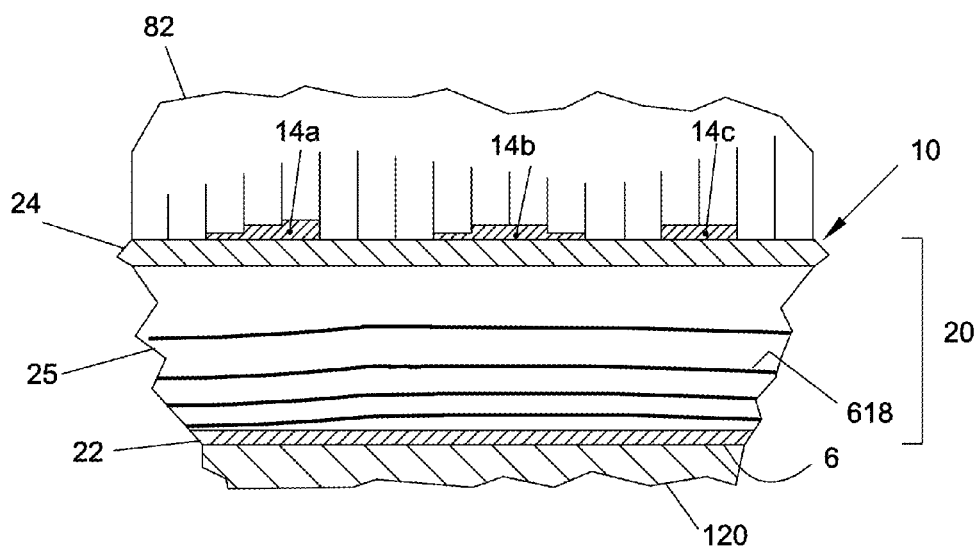
FIG. 22 shows a prior insulation system around the irregular edges of laminations. This employs an external corona protection layer. It shows the equipotential lines that are nearly uniformly distributed. This indicates that even a prior-art insulation system results in negligible stress concentration in the slot voids.

FIG. 22 shows a prior-art insulation system 20 in a partial longitudinal section of stator bar 10. This prior-art insulation system 20 employs multiple layers comprising an ICP layer 22 over the bare bar 120, groundwall insulation 25 over the ICP layer and an ECP layer 24 over the groundwall insulation 25. This ECP layer contacts the iron laminations 82 whose edges are riddled with the same slot voids 14a, 14b, 14c. This figure shows that the potential lines 618 are nearly parallel, but slightly distorted. This indicates electric stress in the slot voids 14a, 14b, 14c increases very slightly.

The disclosed insulation system 200 offers several benefits. Use of the anti-corona tape 150 reduces electric stress in the air voids that are formed not only before the finished groundwall, but those caused by delamination. Such suppression of partial discharges in a delaminated bar greatly increases the life of the stator bar. Use of a single anti-corona tape continuously to wind the entire insulation system obviates the need for multiple layers. Winding it continuously without starts and stops results in economies of scale. Specifically it eliminates several steps, e.g., mounting, dismounting, spooling and terminating each of the four layers, inspecting the insulation at each step etc, greatly saving time and labor. The resistive sublayer, being thermally conductive, increases the net thermal conductivity of the insulation system. This reduces the temperature rise in the stator bar.

I claim:

1. An insulation system over a bare bar of a stator bar comprising an anti-corona tape being wound in a half-lapped manner over the entire periphery and over the entire length of the bare bar; wherein the anti-corona tape comprises multiple first sublayers and multiple second sublayers, wherein each of the first sublayers being electrically insulative and each of the second sublayer has an electrically resistance of greater than 200 ohm/sq and less than 1000 ohm/sq, with the second sublayer engaged to the periphery of the bare bar, and the first sublayer alternating with and engaging the second sublayer; and wherein each of the second sublayers comprises a patterned metallized coating comprising area of low electrical resistance parallel to a width of the first sublayer electrically connected with areas of high electrical resistance parallel to a length of the first sublayer.

2. The insulation system over a bare bar of a stator bar as claimed in claim 1, wherein thickness of the first sublayer is greater than 0.2 mm, and thickness of the second sublayer is less than 0.025 mm.

3. The insulation system over a bare bar of a stator bar as claimed in claim 2, wherein the first sublayer comprises a mica layer.

4. An insulation system over a bare bar of a stator bar wherein the insulation system comprises a first part and a second part, both parts comprising an anti-corona tape being wound in a half-lapped manner over the entire periphery and over the entire length of the bare bar; wherein the anti-corona tape comprises multiple first sublayers and multiple second sublayers, wherein each of the first sublayers being electrically insulative and each of the second sublayer has an electrically resistance of greater than 200 ohm/sq and less than 1000 ohm/sq; wherein in the first part of the insulation system, one of the multiple second sublayers engages the periphery of the bare bar and, in the second part of the insulation system, one of the multiple first sublayers engages the periphery of the first part of the insulation system; and wherein each of the second sublayers comprises a patterned metallized coating comprising area of low electrical resistance parallel to a width of the first sublayer electrically connected with areas of high electrical resistance parallel to a length of the first sublayer.

5. The insulation system over a bare bar of a stator bar as claimed in claim 4, wherein thickness of the first sublayer is greater than 0.2 mm, and thickness of the second sublayer is less than 0.025 mm.

6. The insulation system over a bare bar of a stator bar as claimed in claim 4, wherein the first sublayer comprises a mica layer.

* * * * *